United States Patent [19]
Kamen et al.

[11] Patent Number: 5,447,286
[45] Date of Patent: Sep. 5, 1995

[54] HIGH FLOW VALVE

[75] Inventors: Dean L. Kamen, Bedford; Valentine Faust, Bow, both of N.H.

[73] Assignee: DEKA Products Limited Partnership, Manchester, N.H.

[21] Appl. No.: 184,638

[22] Filed: Jan. 21, 1994

[51] Int. Cl.⁶ .......................................... F16K 31/126
[52] U.S. Cl. ................. 251/30.02; 251/61.3; 251/282
[58] Field of Search ............... 251/61.3, 61.2, 61.1, 251/61, 61.5, 30.02, 282

[56] References Cited

U.S. PATENT DOCUMENTS

| | | | |
|---|---|---|---|
| 2,365,650 | 12/1944 | Shaw et al. | 251/61.3 X |
| 3,570,484 | 3/1971 | Steer | 128/214 |
| 3,648,726 | 3/1972 | Caparone et al. | 137/505.41 |
| 3,806,086 | 4/1974 | Cloyd | 251/149.7 |
| 3,831,629 | 8/1974 | Mackal et al. | 137/525 |
| 3,948,289 | 4/1976 | Flynn | 137/494 |
| 4,231,287 | 11/1980 | Smiley | 92/94 |
| 4,340,083 | 7/1982 | Cummins | 137/499 |
| 4,617,952 | 10/1986 | Fujiwara et al. | 137/85 |
| 4,683,916 | 8/1987 | Raines | 137/854 |
| 4,710,168 | 12/1987 | Schwab et al. | 604/99 |
| 4,787,071 | 11/1988 | Kreuter et al. | 367/140 |
| 4,858,883 | 8/1989 | Webster | 251/61.1 |
| 4,976,162 | 12/1990 | Kamen | 73/865.9 |
| 5,261,442 | 11/1993 | Kingsford et al. | 251/61.3 X |

FOREIGN PATENT DOCUMENTS

| | | |
|---|---|---|
| 792708 | 1/1936 | France . |
| 1802413 | 6/1969 | Germany . |
| 1429932 | 3/1973 | United Kingdom . |
| WO90/13795 | 11/1990 | WIPO . |

*Primary Examiner*—John Rivell
*Attorney, Agent, or Firm*—Bromberg & Sunstein

[57] ABSTRACT

An inflation control system including a high flow valve is controlled by pilot air selectively delivered by a piezo vent valve. The high flow valve includes a pilot input, an outlet and a main air chamber fed with main supply air through a main air conduit. The high flow valve further includes a diaphragm with an upper web, a lower web, a cylindrical member connecting the upper and lower webs and an annular ridge extending radially out around the cylindrical member. A pilot air supply is connected by a pilot air conduit to the pilot input. A piezo pilot valve interposed on the pilot air conduct opens or closes to provide or prevent the pilot air to the high flow valve. The pilot air shifts the high flow valve from a closed to an open state. A vent valve connected to the pilot air conduit removes the pilot air to allow the high flow valve to close. The high flow valve, the pilot air conduit, the piezo pilot valve and the vent valve may all be provided on a single valve module interconnectible with other valve modules of the same design.

16 Claims, 2 Drawing Sheets

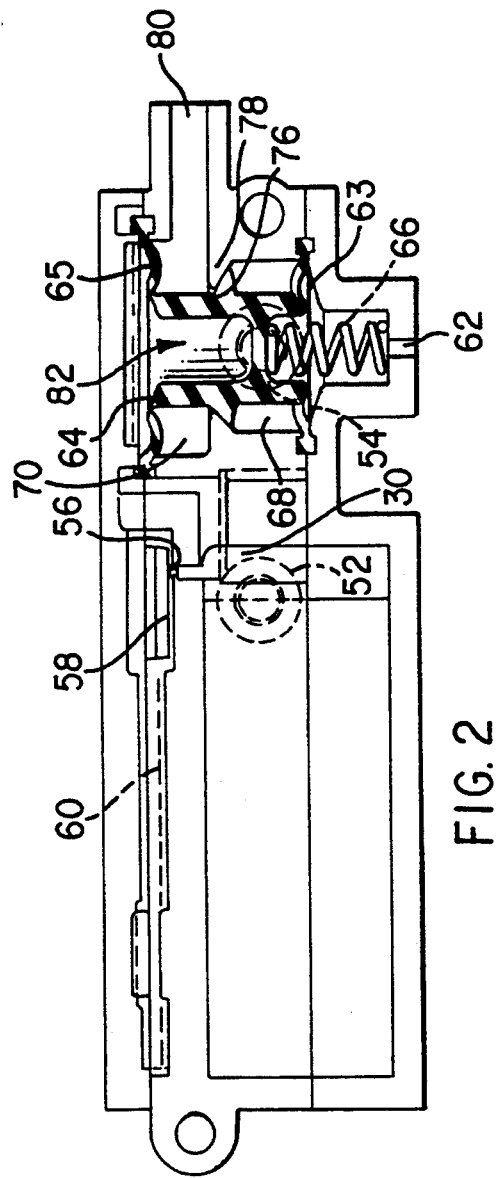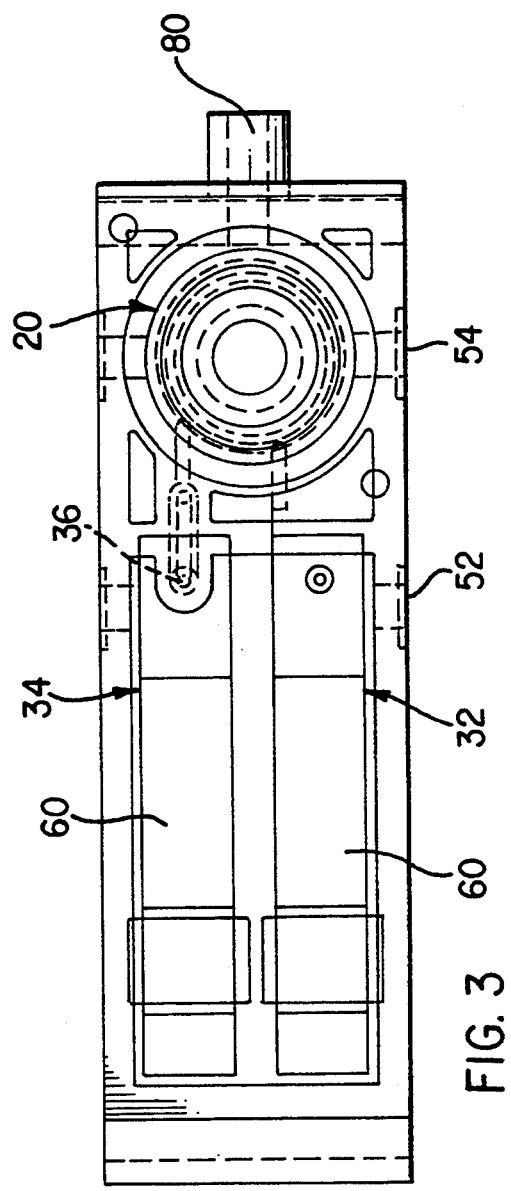

HIGH FLOW VALVE

This application is related to application Ser. No. 07/887,732, filed May 22, 1992 ("Quick Disconnect Valve"), now U.S. Pat. No. 5,353,837 which is a continuation-in-part of application Ser. No. 748,341, filed Aug. 22, 1991, now U.S. Pat. No. 5,116,021, which is a continuation-in-part of application Ser. No. 674,813 (for Flow-Control Valve System), now abandoned, application Ser. No. 673,835 (for Constant Pressure Fluid Supply System), now abandoned, application Ser. No. 674,818 (for Fluid Management System with Auxiliary Dispensing Chamber), U.S. Pat. No. 5,193,990 and application Ser. No. 673,834 (for Membrane-Based Rotary Peristaltic Pump), now abandoned, each of which was filed Mar. 22, 1991, and each of which is a continuation-in-part of application Ser. No. 615,612 filed Nov. 19, 1990, (for Acoustic Volume Measurement with Fluid Management Capability), now abandoned, and application Ser. No. 614,806 filed Nov. 19, 1990 (for Integral Intravenous Fluid Delivery Device), now abandoned, which are continuations-in-part of application Ser. No. 523,801 filed May 15, 1990 (for a Valve System with Removable Fluid Interface), now U.S. Pat. No. 5,088,515, and application Ser. No. 345,387 filed May 1, 1989, issued Dec. 11, 1990, as U.S. Pat. No. 4,976,162 (for an Enhanced Pressure Measurement Flow Control System), which is a continuation-in-part of application Ser. No. 092,481 filed Sep. 3, 1987, issued as U.S. Pat. No. 4,826,482, which is a continuation-in-part of application Ser. No. 022,167 filed Mar. 5, 1987, issued as U.S. Pat. No. 4,808,161, and application Ser. No. 836,023 filed Mar. 4, 1986, issued as U.S. Pat. No. 4,778,451. These related applications are hereby incorporated herein by reference.

BACKGROUND OF THE INVENTION

The present invention is directed to a valve control system, particularly one adaptable for use in controlling the inflation and deflation of a comfort control air bag, such as a lumbar support bag in an automobile seat.

Conventional systems for controlling the inflation or deflation of a pressurized comfort control air bag in an automobile make use of solenoids. Such solenoid valves generally require a relatively large power to operate and make audible clicking noises when they switch. The solenoids when powered, create electromagnetic fields that can interfere with a car's radio. Therefore, shielding is required. Furthermore, such valves are relatively heavy and take up additional space within the automobile.

SUMMARY OF THE INVENTION

The present invention is directed to a valve control system which makes use of electrically controlled piezo valves to control the delivery of pilot air that is used to control the state of a high flow valve connected to an outlet for use with a comfort control air bag, for example.

The inflation control system of the invention provides an input for connection to a main air pressure source. A main air conduit is connected to the input. A normally closed, air piloted, high flow air valve is connected between the main air conduit and an outlet. The high flow valve has a pilot input that is connected to a pilot air conduit. A piezo pilot valve and a vent valve are connected to the pilot input of the high flow valve through the pilot air conduit. The piezo pilot valve selectively connects the pilot input of the high flow valve to a pilot air supply. The vent valve is selectively opened to vent the pilot air conduit. Connection of the pilot input to the pilot air supply opens the high flow valve and connection to the vent allows the valve to return to a closed state.

The vent valve may also be a piezo valve. The two piezo valves and a high flow valve can be conveniently mounted in a module. Several such modules can be connected together to operate a plurality of air bags. One of the modules may be used for connection to a vent so that by opening the vented high flow valve and a high flow valve connected to a bag, the bag can be deflated.

The high flow valve of the invention includes a well with a bottom vent hole and an inner annular ridge. A diaphragm having an upper web, a lower web and a cylindrical member connecting the upper and lower webs is located within the well. The lower web forms an airtight seal above the bottom vent hole. An annular ridge projecting radially out from the cylindrical member forms a seal against the inner annular ridge of the well when the valve is in a closed state. A main air supply port opens into the well between the lower web and the inner annular ridge. An outlet is connected to the well above the inner annular ridge. The upper web forms an airtight seal with the well above the outlet. Application of a sufficient pilot air pressure above the diaphragm moves the diaphragm to separate the annular ridge of the diaphragm from the inner annular ridge of the well permitting open fluid communication between the supply port and the outlet.

Piezo valves advantageously operate quietly and require very low power to operate. The high flow valve can open even if three times the pilot air pressure is fed back through the outlets from an air bag for example.

Other objects and advantages of the invention will become apparent during the following description of the invention taken in conjunction with the drawings.

BRIEF DESCRIPTION OF THE DRAWINGS

FIG. 2 is a side cross-sectional view of an inflation control module for use in the system of FIG. 1.

FIG. 3 is a plan view of the module of FIG. 2.

DETAILED DESCRIPTION OF THE PREFERRED EMBODIMENTS

Figure 1:
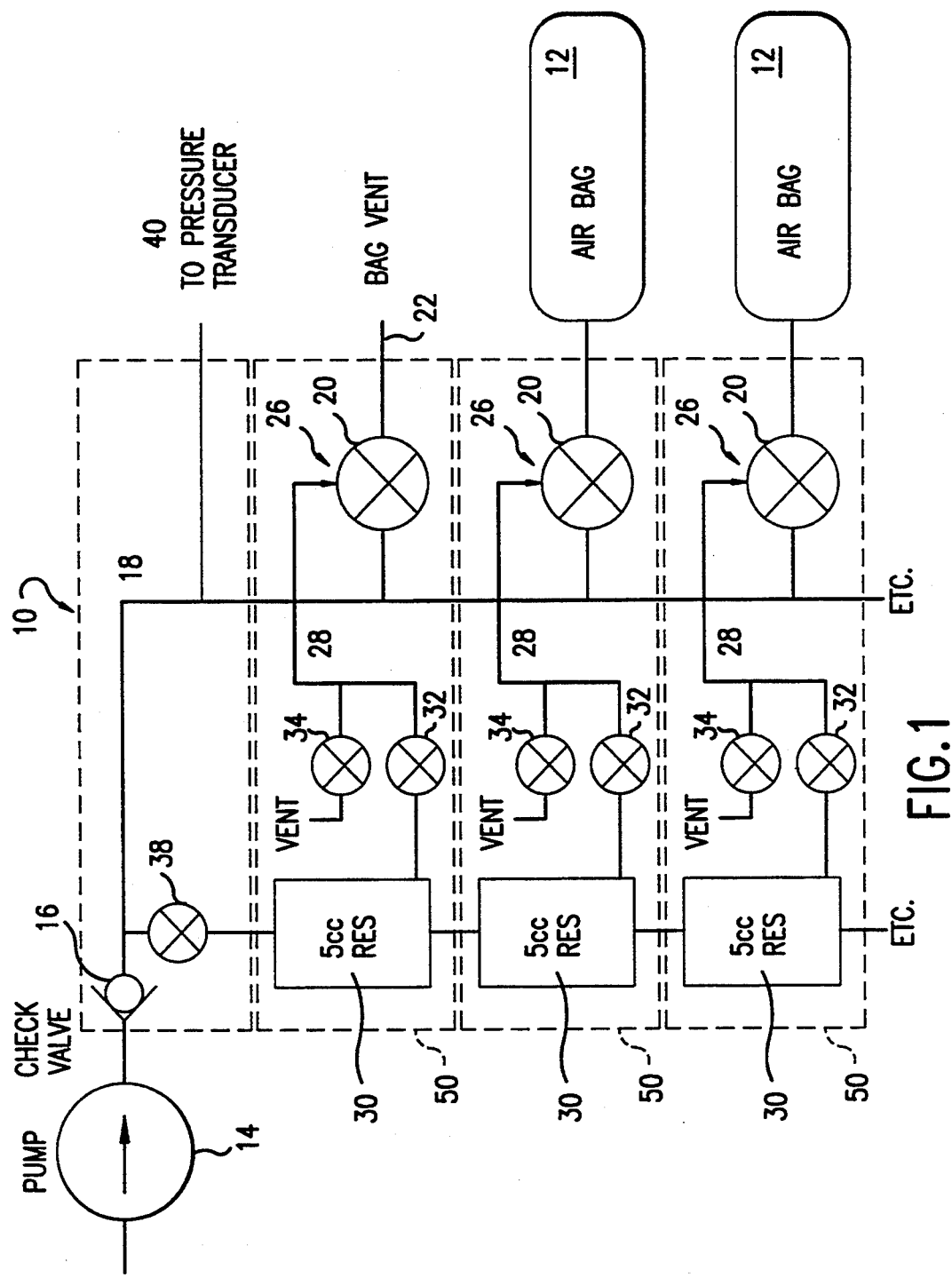
FIG. 1 is a schematic drawing of an inflation control system of the present invention.

Referring now to the drawings, an inflation control system 10 of the invention is shown in schematic form in FIG. 1. The inflation control system may be used to control the inflation and deflation of one or more bags of air 12. These bags 12 may be used in any of a number of applications. For example, comfort control air bags, such as lumbar support air bags inserted in the back support portion of a seat in an automobile is one possible application for the present invention. A main air pressure source, such as an air pump 14, is used as the supply of air for filling the bags 12. The main air pressure of the presently preferred embodiment is about 2 psi. A check valve 16 acts as a one-way valve between the pump 14 and a main air conduit 18. The check valve 16 permits the pump 14 to supply air into the main conduit 18 while preventing air in the main conduit from escaping. Each air bag 12 is connected to a normally closed, air piloted, high flow air valve 20. The high flow valves 20 are connected between the main air conduit 18 and the air bags 12. When a high flow valve 20 is open, air from the main air conduit 18 flows into the air bag 12 associated with that valve. When the high flow valve 20 is closed, the outlet from the valve to the air bag 12 is shut off. Air will then be prevented from entering or leaving the air bag 12. One high flow valve 20 is also provided with its outlet connected to a vent 22. By opening the high flow valve 20 connected to the vent 22, air may escape from the main air conduit 18. Any high flow valve connected to an air bag 12 that is also open when the valve associated with the vent is open, will have its associated air bag deflate.

In accordance with an embodiment of the invention, the high flow valves 20 are controlled through a pilot air inlet. Each high flow valve 20 has a pilot air inlet 26 that is connected to a pilot air conduit 28. A pilot air supply may be maintained as a reservoir 30 of pressurized air. By providing a pilot air supply separate from the main air pressure source, pilot valves can be operated even when the main air is being vented to the vent 22. Advantageously, the flow of pilot air is controlled by a piezo pilot valve 32. A relatively low power electrical signal is all that is required to switch the piezo pilot valve 32 between open and closed. A vent valve 34 is used in each pilot air conduit 28 for selectively controlling an opening of the conduit 28 to a vent 36. The vent valve may also be a piezo valve. With the vent valve 34 open, pilot air escapes through the vent and the high flow valve associated with that pilot air conduit switches to a closed state.

In order to open a high flow valve 20, sufficient pressure must be provided by the pilot air in the conduit 28 to shift the valve to an open state. This is accomplished by closing the vent valve 34 and opening the piezo pilot valve 32.

A pressure transducer 40 may be connected to the main air conduit 18 to monitor the air pressure in the main air conduit and provide an electrical signal back to the control panel of the system indicative of how the system is operating. The pressure transducer 40 may also be used to provide a signal to the pump 14 to maintain an appropriate air pressure in the main air conduit 18.

The pilot air reservoir 30 is arranged so that it may be replenished by the air pump 14 through a valve 38. The valve 38 may also be a piezo valve. The system may operate such that the pump 14 refills the pilot air reservoir whenever the pump is turned on. Alternatively, the pressure in the pilot air reservoir may be monitored to determine whether it is above a predetermined threshold. In accordance with the presently preferred embodiment, the pilot air reservoir is pressurized to about the same pressure as the main air, about 2 psi. A pressure transducer (not shown) could be added to the system to monitor the pilot air. Alternatively, piezo valve 38 could be used to monitor the pressure in the pilot air conduit. A piezo valve includes a piezo bimorph that responds to a mechanical stress such as the air pressure from the pilot air conduit, by creating an electrical signal. Thus, the piezo valve itself may be used to monitor the pressure and control replenishment of the pilot air reservoir.

The inflation control system of an embodiment of the invention can advantageously be made out of a series of modules 50. Each module may be provided with one high flow valve 20, a pilot air conduit 28, a piezo pilot valve 32 and a piezo vent valve 36. The module can be described in greater detail with reference to FIGS. 2 and 3. Each module 50 can be packaged in a rectangular housing. The housing of each module may be made of a hard plastic. On the two opposed long sides of each module, there may be located two ports, a pilot air port 52 for connection to a pilot air reservoir and a main air port 54 for connection to a main air pressure source. The ports are located in the same location on both sides of each module so that the modules can be connected together and the ports may engage one another so that the pilot air conduit and main air conduit are continuous from one module to the next. By connecting the modules together, the pilot air conduit and main air conduit are each formed into manifolds for providing their respective air supplies to each of the modules. Moreover, the modules 50 are manufactured identically making them easy to stock and easy to replace.

The pilot air travels through a passage or chamber within the shell of the module. The module includes an open ended hollow cone 56 sticking out above the pilot air reservoir to provide a very small outlet for pilot air to escape into the piezo valve 32. The shell of the module is preferably made by injection molding two halves and ultrasonically welding them together. The outlet of the hollow cone 56 is covered by a sealing pad 58. The outlet of the hollow cone is made small to reduce the force from the pilot air upon the piezo bimorph and to form a more secure seal with the sealing pad. The sealing pad 58 is mounted on the front end of a piezo bimorph 60. The sealing pad is made of a substance such as silicone rubber. The piezo bimorph 60 is cantilevered over the hollow cone and is fixed in place at its rear end. Electrode terminals are attached at the rear end of the bimorph. An electric signal can be applied to the piezo bimorph 60 causing it to bend, thereby lifting the sealing pad 58 off of the outlet of the hollow cone 56. Pilot air passes out through the hollow cone and into a passageway leading into the pilot input of the high flow valve 20.

The high flow valve 20 is arranged within a circular well. At the bottom of the well, there is a vent 62 that is always open. The vent 62 permits movement of a diaphragm 69 up and down within the well of the valve. A spring 66 is inserted between the bottom of the well and the diaphragm 64. The spring 66 biases the diaphragm in a normally closed state. The diaphragm 64 divides the valve into two chambers, a main air chamber 68 and an outlet chamber 70. The diaphragm 64 includes a flexible lower web 63 affixed to the well above the spring 66 closing off the vent 62 from the main air chamber 68. There is no fluid communication between the vent 62 and the main air chamber 68. The diaphragm 64 includes a cylinder connecting the lower web 63 to an upper web 65. The upper web 65 provides an airtight seal on the well above the outlet chamber 70. Protruding radially outward from the circular cylindrical diaphragm is an annular ridge 76. The ridge 76 engages a corresponding annular ridge 78 protruding in from the wall of the well. The spring 66 biases the diaphragm up such that the outer annular ridge 76 seals the main air chamber against the inward protruding ridge 78 of the well. The inward protruding ridge 78 is located on the well below the outlet chamber 70 and above the main air supply port 54. An outlet 80 is in fluid communication with the outlet chamber 70. The outlet chamber 70 is sealed off from the pilot chamber 82 above the diaphragm by the upper web 65. The diaphragm 64 is an integral piece made of a flexible material such as silicone.

In addition to bias from the spring 66, the high flow valve is kept in a normally closed state by air pressure fed back through the outlet 80 against the upper web 65. This is countered by air pressure from the main air supply against the lower web 63. The cylinder portion of the diaphragm valve serves to reduce the available area of the upper and lower webs to reduce the forces exerted thereon by the outlet chamber air and the main air. It is desirable to balance these available areas along with the available area of the annular diaphragm ridge 76 and the force of the bias spring 66 so that the high flow valve can be opened by the two psi. pilot air even if three times that pressure is exerted back through the outlet 80. If a person leans or sits against a comfort control air bag, the pressure in the bag and hence the pressure exerted back through the outlet 80 is increased. The high flow bag must be able to operate even under these conditions. The dimensions of a presently preferred valve capable of opening in response to 2 psi. pilot air despite a 6 psi backpressure in the outlet chamber 70 are a pilot air chamber of 0.498 inch diameter, a diaphragm cylinder portion having 0.243 inch diameter above the annular ridge 76 and a 0.233 inch diameter below the annular ridge, an inward annular ridge 78 having a diameter of 0.320 inch, and a well diameter of 0.350 below the inward annular ridge. The diameter of the diaphragm's annular ridge 76 is smaller than the diameter of the well below the inward annular ridge 78 so that there is no rubbing when the high flow valve changes state.

When the piezo pilot valve opens, pilot air rushes into the pilot air chamber 82 above the diaphragm 64. When the force from the pilot air is sufficient, the diaphragm is pushed downward opening the seal between the annular ridge 76 and the inward annular ridge 78. The pilot air pressure is spread over the entire cross-sectional area of the web. This applied force must exceed that of the spring 66 and the net upward force applied by the main air and the outlet chamber air on the diaphragm. Main air can then flow through the outlet 80. Outlet 80 may be connected to an air bag 12 or may simply be vented for use in deflating an air bag.

The module 50 also includes a piezo vent valve 34. The piezo vent valve 34 operates on a vent 36 in the top of the rectangular module shell. The sealing pad 58 on the bimorph of the vent valve 34 is arranged on top of the valve so as to close off the vent 36. The vent 36 is forced by an open ended hollow cone. An electric signal to the bimorph in the piezo vent valve 34 is capable of causing the bimorph to bend away from the vent so that pilot air in the pilot air chamber above the high flow valve 20 can escape to the atmosphere through the vent 36. The spring 66 of the high flow valve then rebiases the diaphragm into a closed state. In order to open the high flow valve 20, the piezo vent valve 34 must be closed over the vent 36 and the piezo vent valve 32 must open to allow the pilot air into the pilot air chamber.

Of course, it should be understood that various changes and modifications to the preferred embodiments described will be apparent to those skilled in the art. For example, the orientation, arrangement and size of each of the valves with respect to one another and of the diaphragms and in the valves may be changed into different configurations and orientations. These and other changes can be made without departing from the spirit and the scope of the invention and without diminishing its attendant advantages. It is, therefore, intended that such changes and modifications be covered by the following claims.

We claim:

1. A high flow valve comprising:
   a well having an inner annular ridge, an outlet connected to said well above the annular ridge, a supply port connected to said well below the annular ridge and a vent hole in said well below the supply port;
   a diaphragm having an upper web forming an airtight seal around said well above the outlet, a lower web forming an airtight seal around said well between the supply port and the vent hole, a cylindrical member connecting the lower web to the upper web, a diaphragm wall across the cylindrical member and an annular ridge projecting radially out from the cylindrical member so as to form a seal against the inner annular ridge of said well when said high flow valve is in a closed state; and
   a pilot air chamber disposed above said diaphragm such that the upper web and the diaphragm wall are directly exposed to fluid pressure within said pilot air chamber, wherein said high flow valve achieves an open state upon application of sufficient pressure in said pilot air chamber to move said diaphragm so as to separate the annular ridge of the diaphragm from the inner annular ridge of said well permitting open fluid communication between the supply port and the outlet.

2. The high flow valve of claim 1 further comprising a spring between the bottom of said well and the bottom of said diaphragm for biasing said diaphragm into its closed position.

3. The high flow valve of claim 2 wherein said well, the lower web, the upper web and the cylindrical member are sized so that said high flow valve shifts into the open state when the sufficient pressure is in said pilot air chamber even with as much as three times the sufficient pressure being applied back through the outlet of said high flow valve.

4. The high flow valve of claim 1 wherein the annular ridge of the diaphragm has an outer diameter that is smaller than an inner diameter of said well below the inner annular ridge so that the annular ridge of said diaphragm does not rub against said well when said high flow valve switches between closed and open states.

5. The high flow valve of claim 1 wherein said diaphragm is an integral piece of flexible material including the upper web, the lower web, the cylindrical member, the diaphragm wall and the annular ridge.

6. The high flow valve of claim 5 wherein the flexible material comprises silicone.

7. The high flow valve of claim 1 wherein the upper web of said diaphragm has an outer circumference and the lower web of said diaphragm has an outer circumference such that the outer circumference of the upper web is larger than the outer circumference of the lower web.

8. The high flow valve of claim 1 wherein the diaphragm wall extends across the cylindrical member at a height along the cylindrical member that is spaced apart from a height along the cylindrical member at which the annular ridge projects out.

9. A valve comprising:

a well having an inner annular ridge, an outlet connected to said well above the annular ridge, a supply port connected to said well below the annular ridge and a vent hole in said well below the supply port;

an integral diaphragm having an upper web forming an airtight seal around said well above the outlet, a lower web forming an airtight seal around said well between the supply port and the vent hole, a central connecting portion between the upper web and the lower web, a diaphragm wall spanning across the central connecting portion and an annular ridge projecting radially out from the central connecting portion so as to form a seal against the inner annular ridge of said well when said valve is in a closed state; and wherein said valve achieves an open state upon application of sufficient pressure upon the upper web and the diaphragm wall from above said diaphragm to move said diaphragm so as to separate the annular ridge of the diaphragm from the inner annular ridge of said well permitting open fluid communication between the supply port and the outlet.

10. The valve of claim 9 wherein said diaphragm is arranged such that back pressure from the outlet pushes against the upper web so as to urge said valve toward a closed state.

11. The valve of claim 10 wherein said well, the lower web, the upper web and the central connecting portion are sized so that said valve shifts into the open state when the sufficient pressure is applied above said diaphragm to the upper web and the diaphragm wall even when the back pressure from the outlet is as much as three times the sufficient pressure.

12. The valve of claim 9 further comprising a spring between the bottom of said well and the bottom of the diaphragm for biasing said diaphragm into its closed state.

13. The valve of claim 9 wherein the annular ridge of the diaphragm has an outer diameter that is smaller than an inner diameter of said well below the inner annular ridge so that the annular ridge of said diaphragm does not rub against said well when said valve switches between closed and open states.

14. The valve of claim 9 wherein said diaphragm is made of silicone.

15. The valve of claim 9 wherein the upper web of said diaphragm has an outer circumference and the lower web of said diaphragm has an outer circumference such that the outer circumference of the upper web is larger than the outer circumference of the lower web.

16. The valve of claim 9 wherein the diaphragm wall spans the central connecting portion at a height along the central connecting portion that is spaced apart from a height along the central connecting portion at which the annular ridge projects out.

* * * * *